United States Patent [19]
Beckwith et al.

[11] Patent Number: 5,474,584
[45] Date of Patent: Dec. 12, 1995

[54] ELECTONICALLY CONTROLLED APPARATUS FOR TREATING INDUSTRIAL EXHAUST GASES BY PARTICULATE SEPARATION

[75] Inventors: Carlos A. Beckwith; Carlos M. Beckwith; Francisco J. Barraza, all of Querétaro, Mexico

[73] Assignee: Centro de Investigacion y Asistencia Technica Del Edo. De Qro. A.C., Queretaro, Mexico

[21] Appl. No.: 206,671

[22] Filed: Mar. 7, 1994

[51] Int. Cl.$^6$ ........................................... B01D 50/00
[52] U.S. Cl. ........................ 55/212; 55/268; 55/315; 55/341.1; 55/349; 55/417; 55/429; 55/473
[58] Field of Search ........................ 55/212, 268, 315, 55/318, 341.1, 346, 349, 394, 417, 420, 423, 429, 449, 459.1, 473, DIG. 30

[56] References Cited

U.S. PATENT DOCUMENTS

| | | | |
|---|---|---|---|
| 666,978 | 1/1901 | Ruetschi | 55/268 |
| 2,174,185 | 9/1939 | Carter | 55/315 |
| 2,337,684 | 12/1943 | Scheinsman | 55/315 |
| 2,825,147 | 3/1958 | Silver | 55/315 |
| 2,853,241 | 9/1958 | Gindoff et al. | 55/315 |
| 4,244,715 | 1/1981 | Eisenbarth | 55/315 |
| 4,701,307 | 10/1987 | Walters et al. | 55/318 |

FOREIGN PATENT DOCUMENTS

| | | | |
|---|---|---|---|
| 300201 | 6/1971 | U.S.S.R. | 55/315 |

OTHER PUBLICATIONS

Perry's Chemical Engineers' Handbook, pp. 20-89–20-97.
Cupola Handbook, American Foundry Men's Society, pp. 201-206.

Primary Examiner—C. Scott Bushey
Attorney, Agent, or Firm—Jacobson, Price, Holman & Stern

[57] ABSTRACT

In an electronically controlled apparatus and method therefore for treating hot, dirty industrial exhaust gases utilizing dry environmental particulate separation, a plenum is constructed surrounding vertical hot gas exhaust duct, in which a concentric inlet connects the exhaust duct to the plenum, forming a bellow-discharge-gas-off-take. The plenum forms a settling chamber for coarse particles and housed within the settling chamber is a built in battery of high efficiency, high temperature cyclones, to separate the fine particles from the hot exhaust gases before the gases go through a gas-to-air-heat-exchanger, to transfer the sensible heat of the hot clean gases to the combustion air which in turn saves fuel. The apparatus has a servo-valve through which the cooled clean gases from the heat exchanger pass, and are taken in by a first suction fan. Bag filters contained in a baghouse, for further separation of the ultra fine particles is provided to obtain substantially particle-free cooled gases, which are discharged into the atmosphere. The suction from the fan is regulated by the servo-valve, which is controlled by an electronic controller. The controller is capable of maintaining a non-flow condition in the upward exhaust duct, and concurrently, full flow of the exhaust gases through the servo-valve and the suction fan by adjusting a calibration set point. This would subsequently prevent exhaust gases from escaping to the atmosphere and prevent air infiltration into the exhaust gases. In the alternative, the reverse can be obtained, if desired.

5 Claims, 5 Drawing Sheets

ELECTONICALLY CONTROLLED APPARATUS FOR TREATING INDUSTRIAL EXHAUST GASES BY PARTICULATE SEPARATION

BACKGROUND OF THE INVENTION

1. Field of the Invention

This invention relates to an electronically controlled apparatus for the treatment of industrial exhaust gases and method therefore. More specifically the present invention relates to the treatment of industrial exhaust gases by particulate separation utilizing a dry environment. As such, the use of water for the treatment of particles contaminating the hot industrial gases is avoided and hence the formation of residual industrial water is prevented.

2. Description of Prior Art

Apparatus for the removal of particles from hot gases, which are known in the art, use some form of wet scrubber of which there are many types available: condensation scrubbers, venturi scrubbers, self induced spray scrubbers, spray scrubbers, counter current spray scrubbers, packed bed scrubbers, mobile bed scrubbers, cyclone scrubbers, ejector-venturi scrubbers, etc. These are classified as low energy and high energy scrubbers. Attaining increased efficiency requires increased power consumption, and the power consumption required to attain a given efficiency increases as the particle size of the dust decreases (*Perry's Chemical Engineers' Handbook*). There are many disadvantages in the use of scrubbers:

a) They are large spenders of mechanical energy (fans, pumps, motors and drive shafts).

b) The sensible heat of the gases is lost.

c) They consume great quantities of water.

d) The produce muds that have to be treated.

e) The produce residual waters, that have to be treated.

f) The maintenance is high due to extensive corrosion. The art of blast conditioning, which involves a recuperative system for the transfer of sensible heat from hot dirty exhaust gases to heat the combustion's air, utilizes a heat exchanger and a suction fan. Such a system can result in heavy erosion and involves high maintenance, and furthermore, lacks reliability. Ways of improving reliability and heat efficiency, specifically when the hot exhaust gases contain reducing gases and hence valuable latent heat from $H_2$, CO, CH, etc., previously developed in the art include many variations, such as: Indirect Heat Recuperation, Direct Heat Recuperation, Clean Gas Indirect Heat Recuperation, Dirty Gas Direct Heat Recuperation, see *Cupola Handbook, American Foundrymen's Society*, p202–206. All of the above systems use bellow-discharge-off-take, but with wet scrubbers, with the above mentioned disadvantages. Other systems use valves, doors, or bells to control hot gas flows, involving high maintenance due to distortion and corrosion.

Whatever the precise merits, features and advantages of the above known systems, none of them possess the qualities and features of the process described in the present invention, which include pollution prevention, which is preferable to pollution treatment, the saving of energy and the elimination of the use of water, all of which are major environmental concerns in this day and age.

SUMMARY OF THE INVENTION

An object of this invention is to provide an electronically controlled apparatus and method for the treatment of industrial exhaust gases, for reduced particle emission into the atmosphere and which is energy saving in nature. In this day and age, pollution prevention is preferable to pollution treatment. Also, the saving of energy and conservation of water are major issues today. Hot, dirty industrial gases come from many sources, nearly all of which involve some sort of combustion and usually such gases carry solid particles in suspension. The gas flow is variable and is usually exhausted to the atmosphere by means of an upward vertical duct.

In order to save heat, for example, in the present invention, a plenum is constructed as close as possible to the hot gas source. In a preferred embodiment the plenum is constructed around the vertical hot gas exhaust duct and comprises concentrical inlet, preferably conical, which connects the exhaust duct to the plenum. The outer shell of the plenum surrounds and supports the concentric inlet. The plenum creates a bellow-discharge-off-take to clean the hot gases by a settling chamber for coarse particles and separating fine particles by means of a built in battery of high efficiency, high temperature cyclones. The sensible heat of the hot clean exhaust gases is transferred to the combustion air by means of heat exchanger, thus saving fuel. The cooled clean exhaust gases from the heat exchanger, pass through a servo valve, and are taken in by a suction fan, through which, the cooled clean exhaust gases are either exhausted into the atmosphere, or when the nature of the process produces excessive ultra-fine particles, bag filters are used to obtain substantially particle free cooled exhaust gases.

The suction delivered from the fan and through the servo valve, is controlled by an Electronic Controller which in turn is connected to at least two differential pressure sensors. A first sensor above the hot gas take off in the exhaust duct, and a second sensor or existing atmospheric pressure reference point located in an upper region of the exhaust duct. When the differential pressure i.e., the difference in pressure between the first and second pressure sensors, is electronically maintained close to zero in all operating conditions, the gas or air flow in the upper part of the exhaust duct will also be maintained close to zero. Hence, by way of a calibrated set point the conditions can be regulated to prevent either exhaust gases escaping to the atmosphere, or air infiltration into the exhaust gases. Alternatively, the system can be adjusted to permit either.

Another object of the present invention is to provide an apparatus and method which conserves and hence avoids the formation of residual industrial water.

BRIEF DESCRIPTION OF THE DRAWINGS

For a fuller understanding of the nature and objects of the present invention, reference is made to the following detailed description, which is to be taken in connection with the accompanying drawings, wherein:

FIG. 4b is a vertical cross sectional view of FIG. 4a.

DESCRIPTION OF THE PREFERRED EMBODIMENTS

This invention provides an electronically controlled apparatus and method for the treatment of hot, dirty industrial exhaust gases, which utilizes a dry environment, involves particulate separation and which is energy saving in nature.

Figure 1:
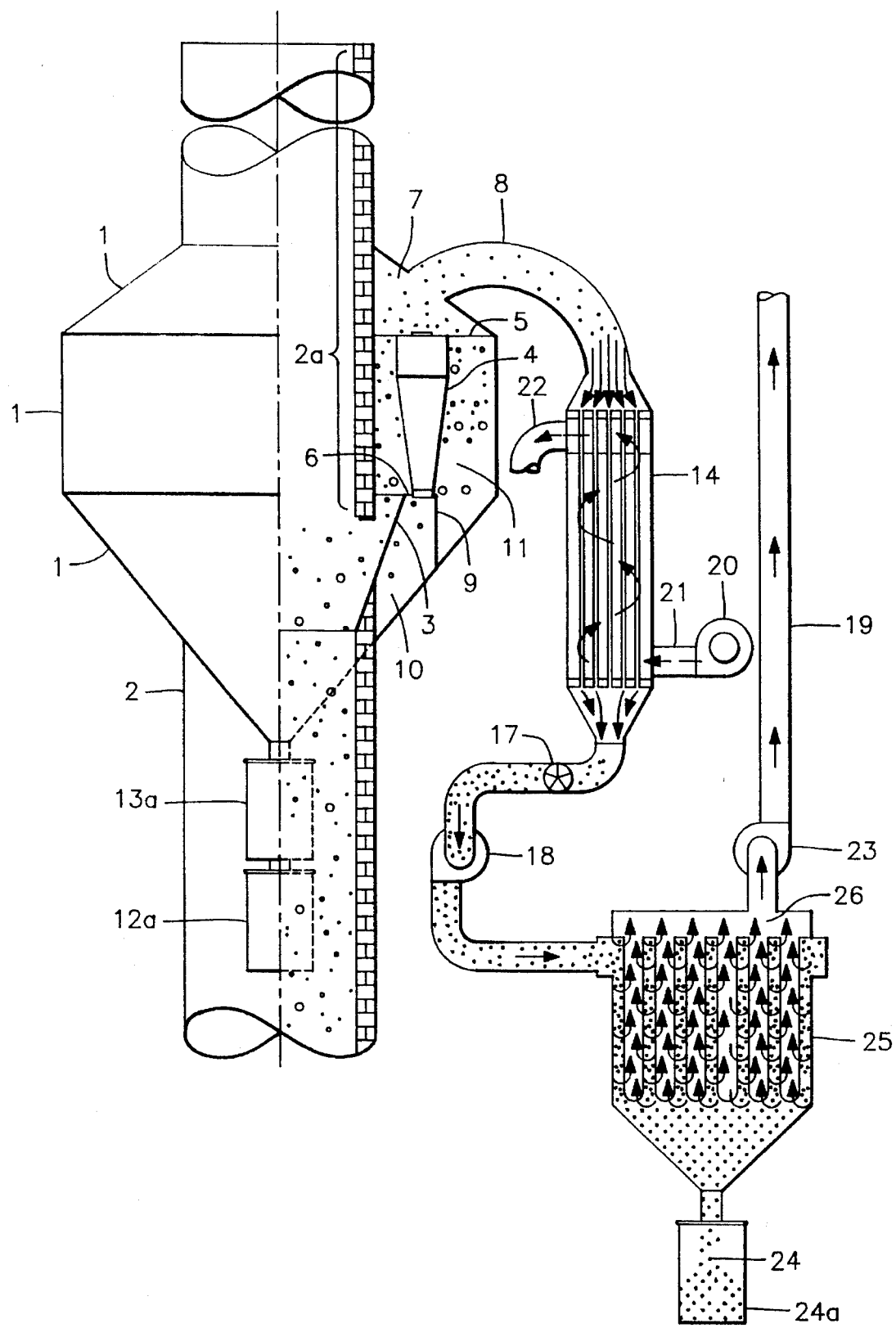
FIG. 1 is a partial cross sectional view of an apparatus in accordance with a preferred embodiment of the present invention.
Figure 2:
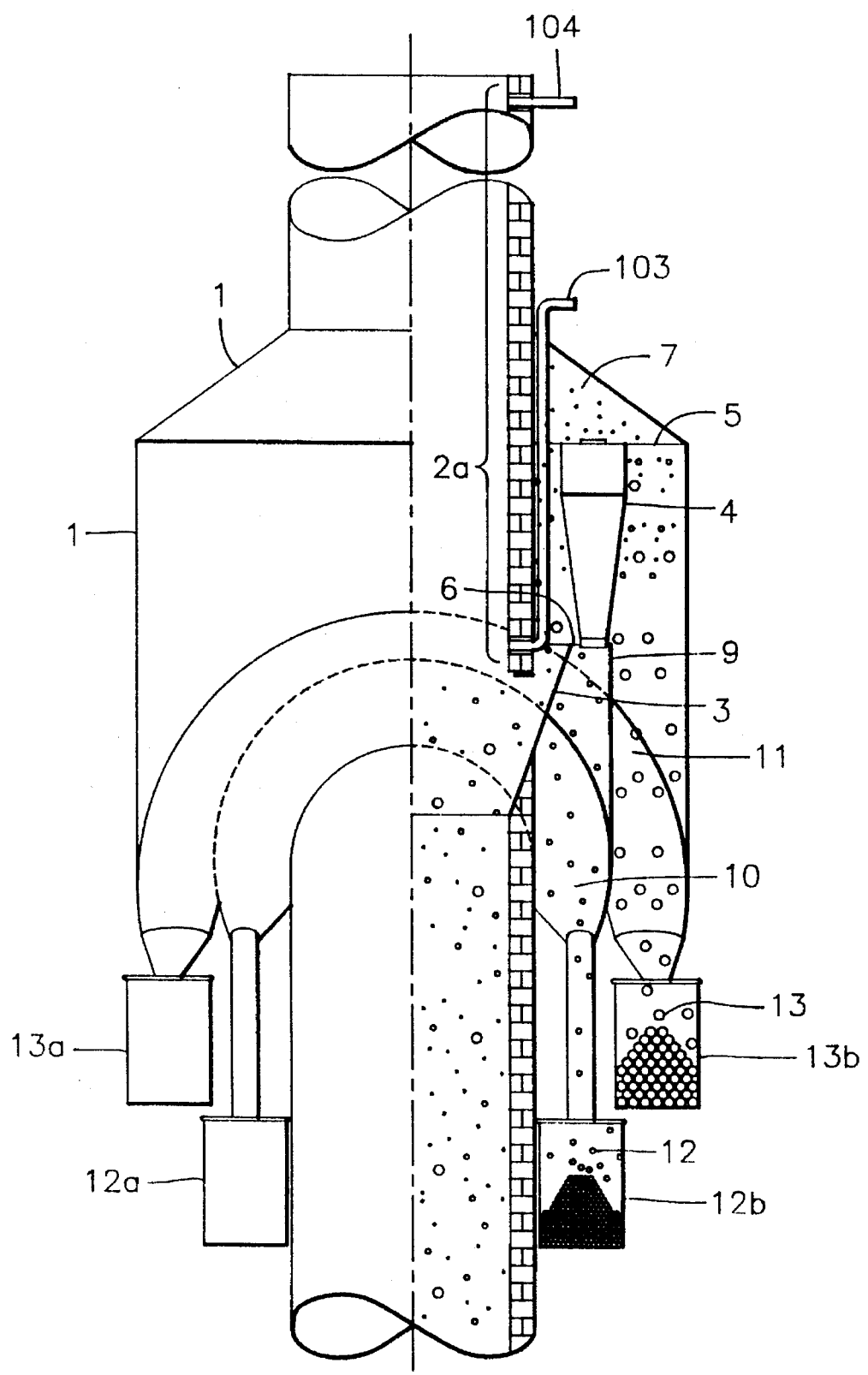
FIG. 2 is a partial cross sectional side view of an apparatus in accordance with a preferred embodiment of the present invention.

FIG. 1, and FIG. 2, illustrate the apparatus of the present invention wherein a plenum 1 is constructed around an upward exhaust duct 2, as close as possible to the hot source, in which, a concentric inlet 3, connects the exhaust duct 2 to the plenum 1. The plenum 1 creates a bellow-discharge-offtake and forms three chambers. The first chamber, is a settling chamber 11, where coarse particles 13, present in the exhaust gas, are settled and collected in outside containers 13a and 13b. The settling chamber 11 is formed by: the exhaust duct 2, circular baffle plate 5, plenum 1, cylindrical baffle 9, plate 6 and concentric inlet 3, said settling chamber 11, also houses a built in battery of high efficiency, high temperature cyclones 4, whereby the gases exhaust the settling chamber 11 through inlets of the cyclone battery 4, dropping fine particles 12 into a fine particle chamber 10, where the fine particles 12 are then collected into outside containers 12a and 12b. The fine particle chamber 10 is formed by: circular baffle plate 6, cylindrical baffle 9, plenum 1, exhaust duct 2 and concentric inlet 3. The gases after being cleaned by the cyclones 4, go into an exhaust chamber 7 and out of the plenum 1 through plenum outlet 8. The exhaust chamber 7, is formed by: circular baffle plate 5, plenum 1 and exhaust duct 2. The sensible heat of the hot clean gases from the plenum outlet 8, is transferred to the combustion air by means of a counter current heat exchanger 14. The cooled cleaner gases from the heat exchanger 14, pass through a servo valve 17 and are taken into a first suction fan 18 which supplies the energy necessary to draw said hot exhaust gases through the apparatus or along the route described instead of being exhausted through the upward exhaust duct.

The exhaust gases from the suction fan 18 are taken to a baghouse 25 which is capable of separating out ultra fine particles 24 present in the exhaust gases and which are then collected into an outside container 24a. The substantially particle-free exhaust gas then passes into a second suction fan 23 which provides the energy loss due to friction from the outlet of this first suction fan 18 through the bag filters and through an atmospheric discharge-duct 19.

An air pressure fan 20 is connected by an air inlet duct 21 to the gas-to-air heat exchanger 14 which transfers heat from the hot exhaust gas to the combustion air. This results in the cooling of the hot exhaust gas concurrently with the heating of the combustion air which exits via a hot air outlet 22, and thereby delivering a hot air blast for combustion at a higher temperature for lower fuel consumption.

Figure 3:
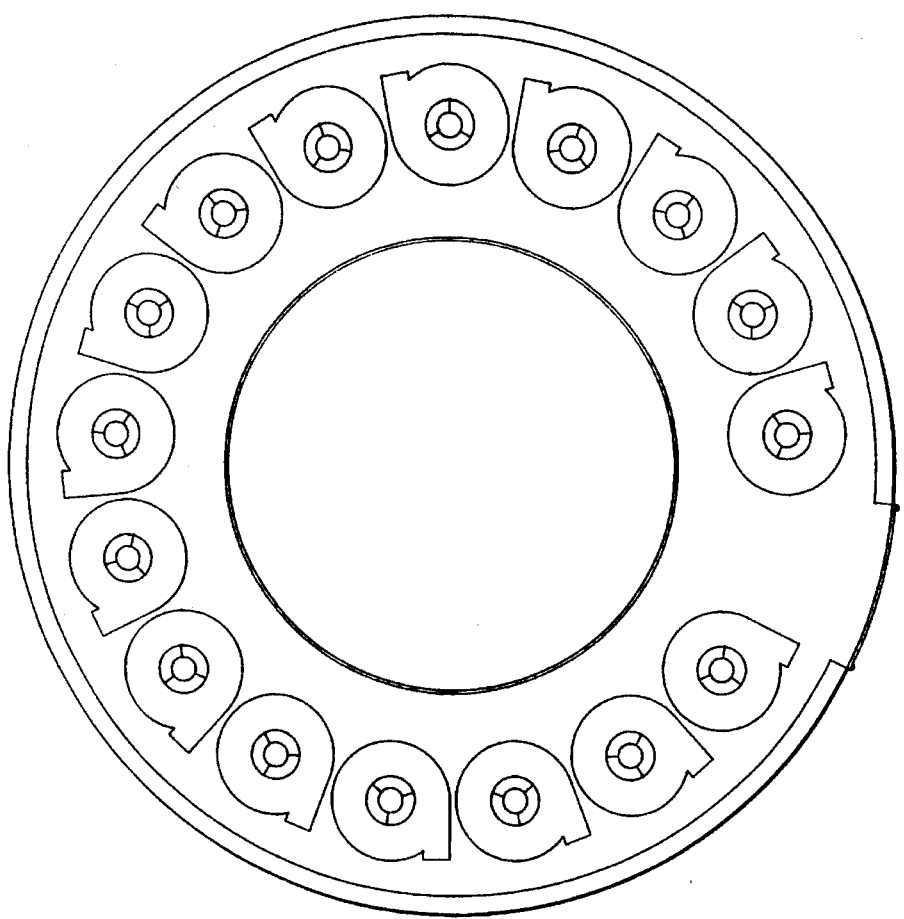
FIG. 3 is a medial cross sectional top view of the arrangement of the battery of the cyclones.

FIG. 3 illustrates the arrangement of the high efficiency, high temperature cyclone battery 4.

Figure 4A:
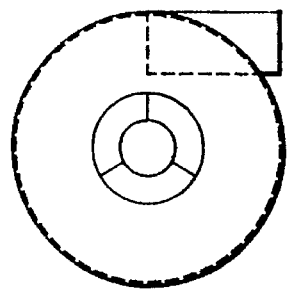
FIG. 4a is a top plan view of a cyclone according to the present invention.
Figure 4B:
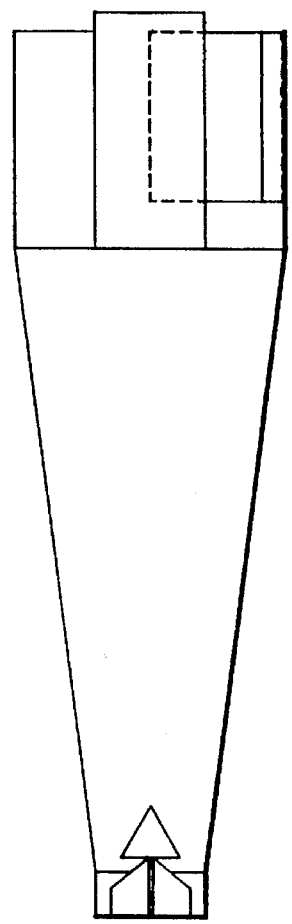

FIGS. 4a and 4b illustrates the construction of one type of cyclone 4 used in the present invention.

Figure 6:
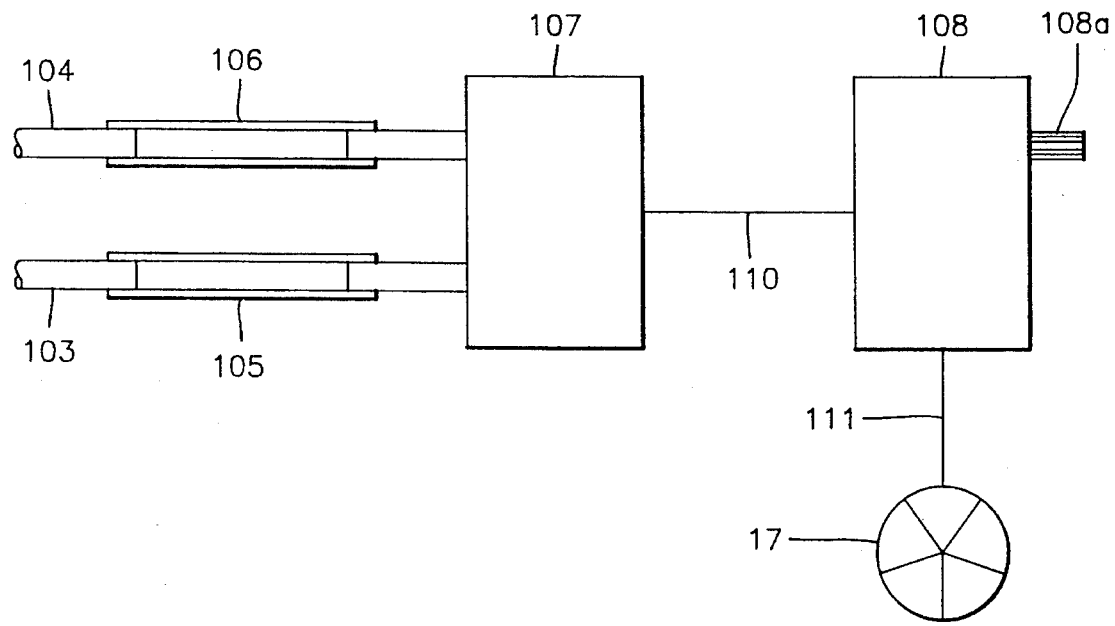
FIG. 6 is a block diagram of the electronic control.
Figure 5:
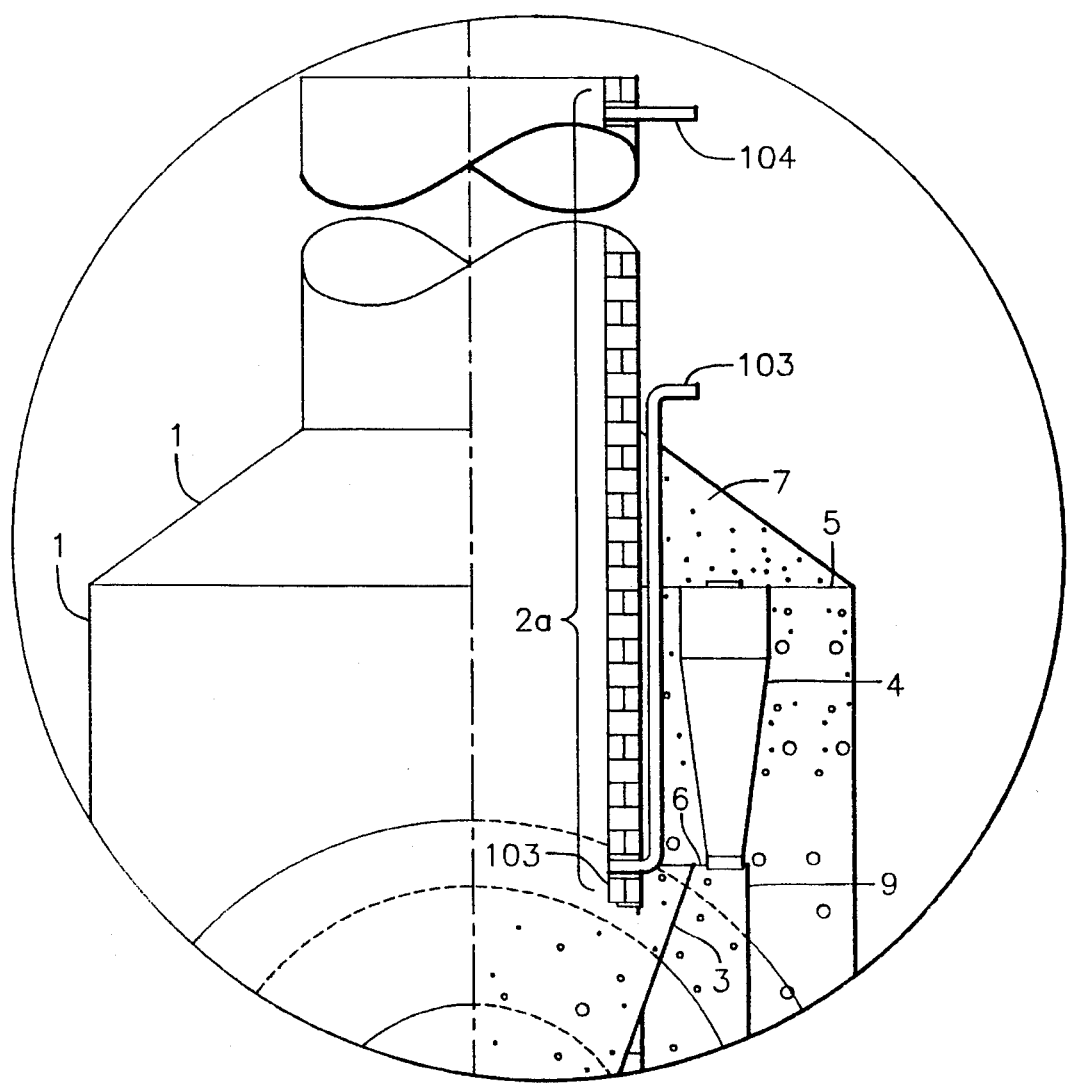
FIG. 5 is an enlargement of the area encircled in FIG. 2.

With reference to FIGS. 5 and 6, when the process changes to a different operating condition, and the flow of gases change, this change is sensed by the differential pressure sensors. Hence the difference in pressures between a control point 103, located above the hot gas takeoff in the exhaust duct 2a and an existing atmospheric pressure reference point 104 located in the upper part of said exhaust duct 2a just below the atmosphere. The measuring points 103 and 104 are connected with tubing lines 105 and 106 to an electronic-differential-pressure-sensor-transmitter 107 where the difference in static pressures is translated into a standard 4 to 20 mA proportional current signal which through a multiple conductor cable 110, is input to a proportional-electronic-controller 108. The controller 108 in turn compares it with a calibration set point 108a, and delivers either a positive or negative DC voltage through a bipolar cable 111, to open or close servo valve 17. This controls the gas out flow in the process by suction fan 18. For example, if the static pressure of the control point 103 is higher than the atmospheric reference point 104 an upward flow of gases is established in the upper part of the exhaust duct 2a due to the difference in static pressure between the control point 103 and the atmosphere 104 of the exhaust duct 2a. This results in some gases escaping to the atmosphere, since, the pressure of the control point 103 is affected by the amount of suction delivered by the suction fan 18 through servo valve 17. Thus if the electronically controlled differential static pressure is maintained close to zero in all operating conditions, the air flow in the upper part of the exhaust duct 2a will also be maintained close to zero. When the static pressure at the control point 103, is below the reference pressure 104, which means that the mass flow through the servo valve 17 is greater than the mass flow of gases through the system, air is drawn from the atmosphere, hence the servo valve 17 will begin to close, to reduce the flow until the predetermined balance is reached. As implied, any predetermined difference can be chosen by the operator and therefore the apparatus and/or system can be regulated to prevent either gases from escaping to the atmosphere, or air infiltration into the system. It can also be adjusted to permit either one.

In summary, when a pressure difference exists the servo valve will open or close to correct the difference, until the pressures are equal, thereby obtaining a non-flow condition in the upward exhaust duct 2a and concurrently a full flow of exhaust gases through the servo valve 17 and suction fan 18.

What is claimed is:

1. An electronically controlled apparatus for the treatment of industrial exhaust gases, said apparatus capable of reducing the number of particles present in said gases which might otherwise be exhausted into the atmosphere; said apparatus comprising:

a plenum, an outer shell of which is constructed to surround an upward exhaust duct, said plenum having a concentric inlet connecting said upward duct with said plenum and an outlet duct;

a settling chamber located within said plenum wherein settled coarse particles present in said exhaust gases are collected into at least one outside container, said settling chamber housing a plurality of high efficiency, high temperature cyclones for cleaning said exhaust gases, each cyclone having at least one inlet through which said gases are exhausted from said settling chamber;

a fine particle chamber which receives fine particles present in said exhaust gas and which have been separated out by said cyclones, said fine particles being dropped and collected into at least one outside container;

an exhaust chamber located within said plenum, downstream of said plurality of cyclones, for receiving said cyclone cleaned exhaust gases, said exhaust chamber being connected to said plenum-outlet-duct;

a counter-current gas-to-air heat exchanger located downstream of and connected to said plenum-outlet-duct, said heat exchanger having a combustion air inlet, an air pressure fan connected to said air inlet, a hot air outlet for the removal of heated combustion air, said heat exchanger for transferring sensible heat of said exhaust gases to combustion air thereby cooling said exhaust gas while concurrently heating combustion air such that said heated combustion air can be delivered for combustion at a high temperature resulting in lower fuel consumption;

a servo-valve located downstream of said heat exchanger;

a first suction fan located downstream of said servo-valve for supplying the energy necessary to draw said exhaust gas through said apparatus, whereby the intake of exhaust gas through said first suction fan is modulated by said servo-valve;

a baghouse located downstream of said first suction fan and connected to at least one outside container, said baghouse for separating out ultra-fine particles which, once removed from said exhaust gas, are collected in said outside container;

a second suction fan located downstream of said baghouse for drawing substantially particle free exhaust gas therefrom, said fan being connected to an outlet duct through which said substantially particle free gases are exhausted into the atmosphere;

means for measuring changes in gas flow within said upward exhaust duct by way of at least two differential pressure sensors, a first differential pressure sensor located in a lower region of said exhaust duct, above the concentric inlet of said plenum and a second differential pressure sensor located above said first sensor, in an upper region of said exhaust duct;

a differential pressure sensor transmitter connected to said first and second sensors, said transmitter for translating and transmitting a signal;

an electronic controller having a built in calibration set point, said controller being connected to said servo-valve and said differential pressure sensor transmitter and being capable of opening and closing said valve in response to said transmitted signal;

wherein by modulating the servo-valve and the first suction fan therefore, the pressure in said upward exhaust duct can be regulated to prevent exhaust gases from escaping into the atmosphere via said exhaust duct and prevent air infiltration into the exhaust gases via said exhaust duct by providing a non-flow condition in the upper region of the exhaust duct and a full flow condition through said servo-valve.

2. The apparatus of claim 1 wherein said plenum provides a bellow-discharge-gas-off-take.

3. The apparatus of claim 1 wherein said second fan provides the energy loss due to friction from the first suction fan.

4. The apparatus of claim 1 wherein said differential pressure transmitter changes the difference in pressure between the first and second sensors into a standard 4–20 mA proportional current signal for input into said electronic controller.

5. The apparatus of claim 4 wherein the electronic controller compares said input signal from said transmitter with said calibrated set point and delivers either a negative or positive DC voltage to said servo-valve to respectively open or close said valve.

\* \* \* \* \*